US008482553B2

(12) United States Patent
Matsuo

(10) Patent No.: US 8,482,553 B2
(45) Date of Patent: Jul. 9, 2013

(54) DRIVE CIRCUIT FOR DRIVING MEMORY-TYPE LIQUID CRYSTAL

(75) Inventor: Hiroyuki Matsuo, Inagi (JP)

(73) Assignee: Fujitsu Frontech Limited, Tokyo (JP)

( * ) Notice: Subject to any disclaimer, the term of this patent is extended or adjusted under 35 U.S.C. 154(b) by 0 days.

(21) Appl. No.: 13/449,887

(22) Filed: Apr. 18, 2012

(65) Prior Publication Data

US 2012/0206431 A1 Aug. 16, 2012

Related U.S. Application Data

(63) Continuation of application No. PCT/JP2010/000566, filed on Jan. 29, 2010.

(51) Int. Cl.
*G06F 3/038* (2006.01)
*G09G 5/00* (2006.01)
*G09G 3/36* (2006.01)

(52) U.S. Cl.
USPC ............................................ 345/211; 345/92

(58) Field of Classification Search
USPC ......................................................... 345/211
See application file for complete search history.

(56) References Cited

U.S. PATENT DOCUMENTS

| | | | | |
|---|---|---|---|---|
| 7,407,025 | B2 * | 8/2008 | Urakabe et al. | 180/65.1 |
| 2002/0036636 | A1 * | 3/2002 | Yanagi et al. | 345/211 |
| 2003/0025655 | A1 | 2/2003 | Ochi et al. | |
| 2005/0200606 | A1 * | 9/2005 | Willemin et al. | 345/166 |
| 2010/0277453 | A1 * | 11/2010 | Wang et al. | 345/211 |

FOREIGN PATENT DOCUMENTS

| | | |
|---|---|---|
| JP | 11-122843 | 4/1999 |
| JP | 2001-337651 | 12/2001 |
| JP | 2002-072976 | 3/2002 |
| JP | 2003-43996 | 2/2003 |
| JP | 2005-283821 | 10/2005 |
| JP | 2006-14456 | 1/2006 |
| JP | 2008-58927 | 3/2008 |
| JP | 2009-237027 | 10/2009 |

OTHER PUBLICATIONS

Int'l. Search Report issued in Int'l. App. No. PCT/JP2010/000566, mailed Apr. 6, 2010.
Japanese Office Action issued in corresponding Japanese App. No. 2011-533476, mailed Apr. 2, 2013 (with partial translation).

* cited by examiner

*Primary Examiner* — Charles V Hicks
(74) *Attorney, Agent, or Firm* — Greer, Burns & Crain, Ltd.

(57) ABSTRACT

In a drive circuit for driving a liquid crystal display element with a memory property, electric charges accumulated in a power-supply smoothing capacitor at the subsequent stage of a booster circuit are collected effectively after electricity is supplied to the liquid crystal display element. The drive circuit for driving the liquid crystal display element with a memory property supplies a boosted voltage to the driver circuit by turning on a first switch circuit while the liquid crystal display element is being reset or while an image is being rendered, and causing electric charges accumulated in the power-supply smoothing capacitor to be discharged while collecting them into a second battery by turning on a second switch circuit during a period in which electric charges accumulated in the power-supply smoothing capacitor should be discharged.

3 Claims, 4 Drawing Sheets

DRIVE CIRCUIT FOR DRIVING MEMORY-TYPE LIQUID CRYSTAL

CROSS-REFERENCE TO RELATED APPLICATIONS

This application is a continuation application of International PCT Application No. PCT/JP2010/000566, filed on Jan. 29, 2010, the entire contents of which are incorporated herein by reference.

FIELD

The present invention relates to a technology for driving a liquid crystal display element which has a memory property.

BACKGROUND

A liquid crystal display element called a memory-type liquid crystal display, which maintains content displayed on the screen even after the power is turned off, does not need electricity at any moment other than a moment at which an image to be displayed on the display is written. Accordingly, the element has the advantage of requiring only a very small amount of electricity in comparison with typical liquid crystal displays which always need electricity while they are displaying an image.

Utilizing this characteristic, the memory-type liquid crystal display is expected to be applied to electronic paper and electronic books and to portable telephones and mobile devices whose power consumption must be decreased.

Liquid crystal display elements, such as cholesteric liquid crystal displays and chiral nematic liquid crystal displays, are known as memory-type liquid crystal displays.

A high voltage is needed to drive the memory-type liquid crystal display. When it is assumed that the display is driven with a battery so that it can be used for a handheld terminal instrument or the like, it is necessary to supply a battery voltage which has been boosted to, for example, about +38 or +40 volts. Accordingly, the power consumption after the boosting of voltage needs to be considered. Since the memory-type liquid crystal display does not need electricity except for while the liquid crystal display screen is being rewritten, it is controlled to turn the power off when rewriting of the screen is finished after the power is turned on.

However, when the liquid crystal display screen is partly rewritten consecutively, the time period for a single screen-rewriting operation, i.e., the time required to apply a voltage to the liquid crystal display, becomes short, and hence the rate of time needed to boost a voltage for each screen-rewriting operation becomes relatively high, with the result that power consumption increases.

Therefore, to utilize the power-saving property of the memory liquid crystal display, it is necessary to solve a problem of how to reduce the power consumption after boosting of voltage.

Taking a current liquid crystal display as an example, the battery voltage (e.g., about +4.2 volts) is boosted to, for example, +38 volts at the time of resetting and boosted to, for example, +24 volts at the time of rendering an image. The time needed for resetting is, for example, 200 to 300 ms and the time needed for rendering an image is, for example, about 1 to 10 sec. Conventionally, electric charges accumulated, during the resetting period or image rendering period, in a high-capacity power-supply smoothing capacitor or the like installed at the subsequent stage of the booster circuit for the purpose of stabilization of the power supply or the like were discharged naturally or forcibly after a voltage was applied to the liquid crystal display element.

In the meantime, patent document 1 below discloses a technology for collecting electric charges accumulated in a liquid crystal display element which has a memory property.

However, when electric charges accumulated in a power-supply smoothing capacitor or the like at the subsequent stage of a booster circuit are discharged naturally or forcibly after electricity is supplied to the liquid crystal display element, the accumulated electric charges are abandoned; accordingly, there is a problem in which electricity is not effectively used or the power-saving property is not achieved by the configuration.

In the meantime, the prior art described in patent document 1 is a system for collecting electric charges from a liquid crystal display element; however, to utilize the memory property of the liquid crystal display element, it appears that electric charges in the liquid crystal display element need to be eliminated after electricity is supplied by terminating an output drive voltage. Accordingly, there is a problem in which sufficiently collecting electricity accumulated between liquid crystal display elements is thought to be difficult.

Patent Document

Patent document 1: Japanese Laid-open Patent Publication No. 2002-72976

SUMMARY

One of the objects of the present invention is to effectively utilize electricity supplied to a liquid crystal display element.

In an exemplary aspect, a drive power supply is generated from a first battery within an apparatus or an external power supply input from outside the apparatus; the voltage of the drive power supply is boosted to generate a boosted voltage; the boosted voltage is supplied via a power-supply smoothing capacitor to a driver circuit of a liquid crystal display element which has a memory property, with the result that a drive circuit for driving the liquid crystal display element is achieved. The drive circuit has the following configuration.

A first switch circuit is ON while the liquid crystal display element is being reset or while an image is being rendered, and, during a period in which an electric charge accumulated in the power-supply smoothing capacitor should be discharged, the first switch circuit is turned off to supply a boosted voltage to the driver circuit.

A second battery is installed within the apparatus.

A second switch circuit is ON during a period in which electric charges accumulated in the power-supply smoothing capacitor should be discharged, and it is OFF while the liquid crystal display element is being reset or while an image is being rendered.

During a period in which the second switch circuit is ON, a charge-and-discharge control circuit causes electric charges accumulated in the power-supply smoothing capacitor to be discharged while collecting them into the second battery.

The aforementioned configuration enables electricity supplied to the liquid crystal display element to be collected effectively. It is also possible to improve the image rendering capability of a system including the liquid crystal display element.

DESCRIPTION OF EMBODIMENTS

In the following, the best modes for carrying out the invention will be described in detail with reference to the drawings.

Figure 1:
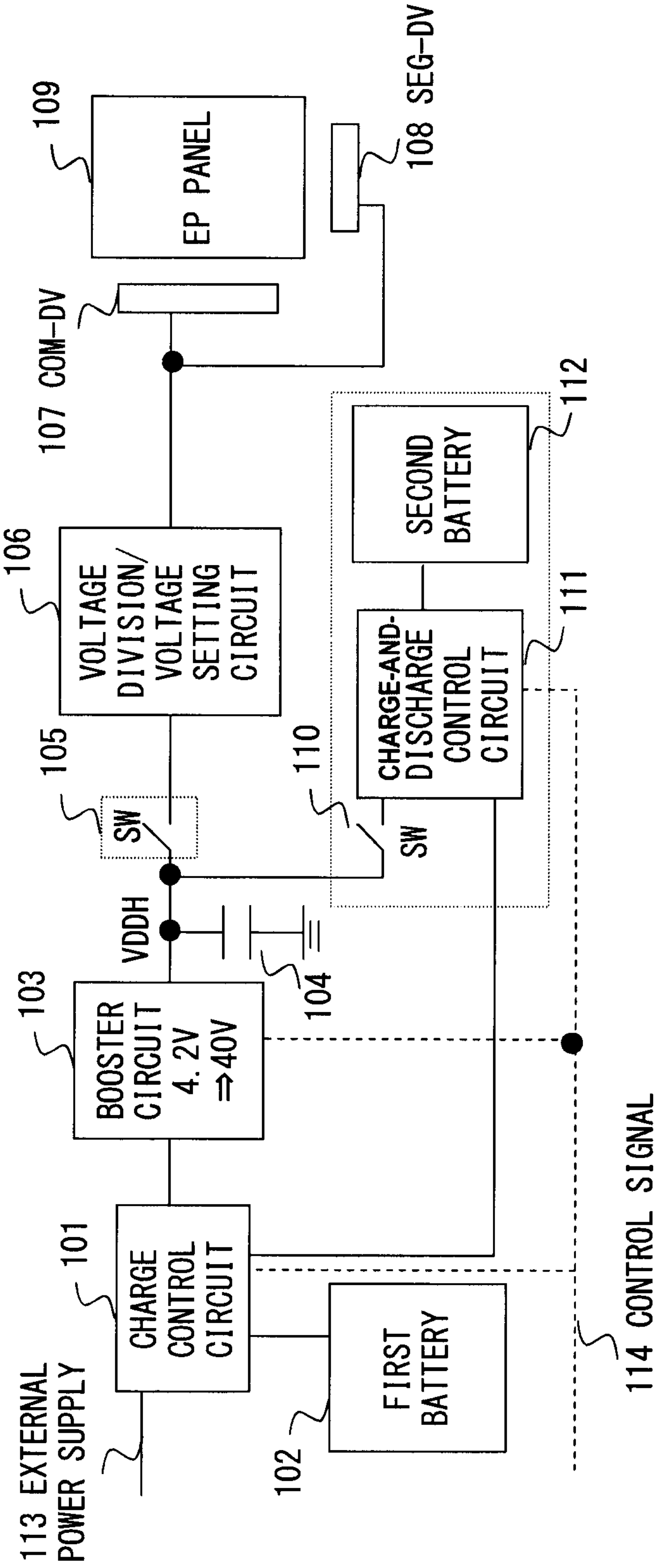
FIG. 1 is a configuration diagram illustrating a first embodiment.

FIG. 1 is a configuration diagram illustrating the first embodiment, and this diagram illustrates the configuration of a basic embodiment of a drive circuit of a memory-type liquid crystal display element used for, for example, an electronic paper application. This configuration includes a charge control circuit 101, a first battery 102, a booster circuit 103, a power-supply smoothing capacitor 104, a switch 105, a voltage division/voltage setting circuit 106, a common driver integrated circuit (COM-DV) 107, a segment driver integrated circuit (SEG-DV) 108, an electronic paper panel (EP panel) 109, a switch 110, a charge-and-discharge control circuit 111, and a second battery 112.

The charge control circuit 101 is connected to an AC adaptor power supply 113 or the like to charge the first battery 102, which is a main battery, and to supply drive power supply to the booster circuit 103 and the like. If there is an external power supply 113, electricity is supplied to the booster circuit 103 and the like while the first battery 102 is being charged. If the external power supply 113 is not provided, electricity is supplied from the first battery 102 to the booster circuit 103 and the like.

When a screen rewriting request signal for rewriting of the screen of the EP (electronic paper) panel 109 is generated by software or the like, the booster circuit 103 is turned on by a voltage boost control signal included in a control signal 114. The booster circuit 103 boosts a drive power supply, e.g., a +4.2-volt drive power supply, supplied from the AC adaptor power supply 113 or the first battery 102 via the charge control circuit 101 to, for example, about +40 volts, wherein the boosted drive power supply is referred to as a boosted voltage VDDH. The boosted voltage VDDH is then supplied to the voltage division/voltage setting circuit 106 via the power-supply smoothing capacitor 104 and the switch 105.

The power-supply smoothing capacitor 104 is connected between the boosted voltage VDDH and ground to stabilize the boosted voltage VDDH.

The switch 105 is ON while an image is being rendered on the screen of the EP (electronic paper) panel 109, thereby supplying the boosted voltage VDDH, which is a drive power supply, to the voltage division/voltage setting circuit 106.

The voltage division/voltage setting circuit 106 generates various voltages for driving the EP panel 109 in accordance with the boosted voltage VDDH and supplies these generated voltages to the COM-DV (common driver) 107 and the SEG-DV (segment driver) 108, which drive the EP panel 109. The COM-DV 107 is an integrated circuit for driving bus lines on a surface of the EP panel 109 including the horizontal-line side (i.e., the scanning-line side). The SEG-DV 108 is an integrated circuit for driving the segment-side bus lines within the EP panel 109.

The EP panel 109 is a memory-type liquid crystal display element such as a cholesteric liquid crystal display element. On rendering an image, an image rendering signal is supplied to the COM-DV 107 and the SEG-DV 108. The COM-DV 107 and the SEG-DV 108 render an image by driving the EP panel 109 in accordance with a drive voltage supplied from the voltage division/voltage setting circuit 106. In particular, the supply of the boosted voltage VDDH is started upon turning on the booster circuit 103, an image rendering operation is then performed after passage of a time interval which starts when a reset operation on the EP panel 109 starts, and, after the image rendering is finished, the booster circuit 103 is turned off to stop the supply of the boosted voltage VDDH.

In accordance with the memory property which the liquid crystal element of the EP panel 109 itself has, the EP panel 109 maintains display contents of the screen on which an image has been rendered, even after the image rendering operation by the COM-DV 107 and the SEG-DV 108 is finished.

The switch 110 is turned on in synchrony with the turning off of the booster circuit 103 at the finishing of the resetting of the EP panel 109 (when there is no image rendering operation) or the finishing of the image rendering operation on the EP panel 109, and, at the same time, the switch 105 is turned off. As a result, electric charges accumulated within the power-supply smoothing capacitor 104 are discharged by the charge-and-discharge control circuit 111 while the second battery, which is a sub battery, is obtaining the charge of the discharged electric charges. This operation is performed each time resetting of the EP panel 109 is finished (when there is no image rendering operation) or each time an image rendering on the EP panel 109 is finished, with the result that the second battery 112 is charged repeatedly.

The amount of charge of the second battery 112 is monitored as a charge monitoring signal included in the control signal 114. As a result, when the amount of charge of the second battery 112 is enough to supply electricity, the electricity supplied from the charge control circuit 101 to the booster circuit 103 is switched from the electricity from the AC adaptor power supply 113 or the first battery 102 to the electricity from the second battery 112. This switching is performed via the charge control circuit 101 and the charge-and-discharge control circuit 111 being controlled by an input power supply switching signal included in the control signal 114.

The first embodiment described above is characterized in that, while the EP panel 109 which is a memory-type liquid crystal element is being driven, electric charges accumulated within the power-supply smoothing capacitor 104 are accumulated, via the switch 110, into the second battery 112 for collection of electric charges, and these accumulated charges are fed back to the booster circuit 103 and are reused to drive the liquid crystal, wherein the booster circuit 103 is, for example, a charge pump type booster circuit.

Conventionally, electricity accumulated within the power-supply smoothing capacitor 104 in accordance with the boosted voltage VDDH for driving the EP panel 109 has been discharged naturally after the resetting of the EP panel 109 is finished (when there is no image rendering operation) or after image rendering is finished.

In the first embodiment, by contrast, the releasing of electricity via the switch 110 is performed quickly by the charge-and-discharge control circuit 111, and the second battery 112 is charged.

As a result, electricity is discharged from the power-supply smoothing capacitor 104 in a shorter time than in the prior art so that the setting voltage can be achieved in a shorter time.

In addition, electricity accumulated within the second battery 112 is accessorily supplied to the booster circuit 103 when the next reset operation or the next image rendering operation is performed on the EP panel 109, and this can aid in the improvement of efficiency of the system power supply and also reduce the time needed to boost voltage.

When the EP panel 109 is frequently partially rendered, the number of times the second battery 112 is charged by the power-supply smoothing capacitor 104 increases each time an image rendering operation is finished. As a result, the electricity recovery rate becomes high so that more electricity can be accessorily supplied from the second battery 112 to the booster circuit 103.

Figure 2:
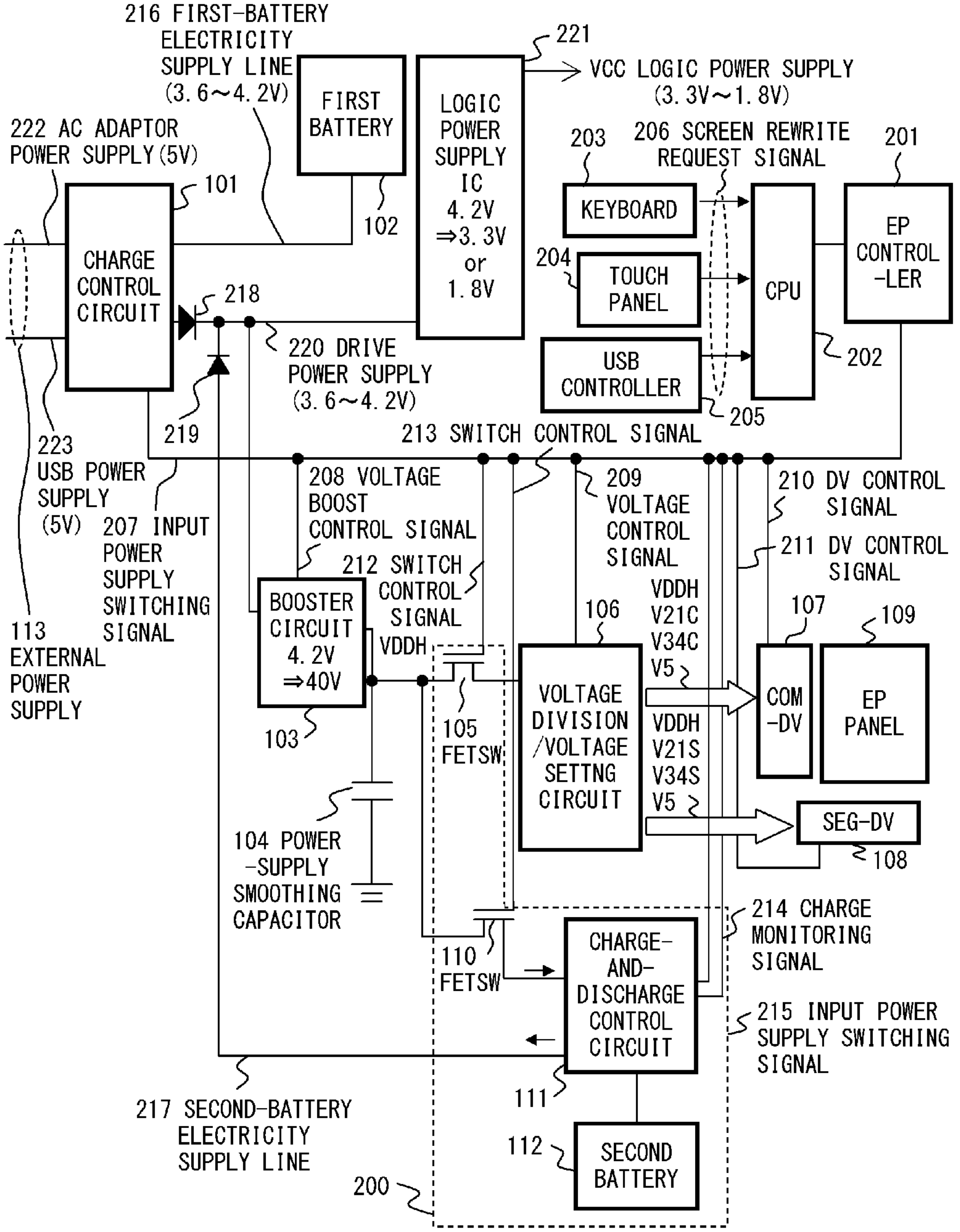
FIG. 2 is a configuration diagram illustrating a second embodiment.

FIG. 2 is a configuration diagram illustrating the second embodiment, and this diagram illustrates the configuration of a detailed embodiment of a drive circuit of a memory-type liquid crystal display element used for, for example, an electronic paper application. The configurations and the basic operations of the charge control circuit 101, the first battery 102, the booster circuit 103, the power-supply smoothing capacitor 104, the switch 105, the voltage division/voltage setting circuit 106, the common driver integrated circuit (COM-DV) 107, the segment driver integrated circuit (SEG-DV) 108, the electronic paper panel (EP panel) 109, the switch 110, the charge-and-discharge control circuit 111, and the second battery 112 illustrated in FIG. 2 are similar to those of the first embodiment illustrated in FIG. 1. An EP controller 201, a CPU 202, a keyboard 203, a touch panel 204, a USB controller 205, signals 206 to 215, a first-battery electricity supply line 216, a second-battery electricity supply line 217, diodes 218 and 219, a drive power supply 220, a logic power supply IC 221, an AC adaptor power supply 222, and a USB power supply 223 are further indicated in the second embodiment. The switches 105 and 110 in FIG. 1 are respectively realized in FIG. 2 as FET switches 105 and 110 each using a field-effect transistor. The signals 206 to 215 correspond to the control signal 114 in FIG. 1. The AC adaptor power supply 222 and the USB power supply 223 correspond to the external power supply 113 in FIG. 1.

In the following, specific operations of the second embodiment illustrated in FIG. 2 will be described using the flowchart in FIG. 3 and the timing chart in FIG. 4.

First, a screen rewrite request signal 206 is generated as an instruction from a USB device (not particularly illustrated) connected to the keyboard 203, the touch panel 204, or the USB controller 205. As a result, the CPU 202 starts to execute a control program stored in a memory (not particularly illustrated). Operations of the control program are illustrated in the flowchart in FIG. 3.

First, an EP logic power supply turning-on process (step S301 in FIG. 3) and an EP drive power supply turning-on process (step S302 in FIG. 3) are performed.

In steps 301 and 302, using a charge monitoring signal 214 from the charge-and-discharge control circuit 111, the EP controller 201 determines whether the amount of charge of the second battery 112 is enough or not.

When the amount of charge of the second battery 112 is not enough, the EP controller 201 uses an input power supply switching signal 207 to cause the charge control circuit 101 to perform the following controls. That is, when there is an input from the AC adaptor power supply 222 or the USB power supply 223, the charge control circuit 101 charges the first battery 102 while supplying electricity of the drive power supply 220 to the logic power supply IC 221 and the booster circuit 103 via the diode 218. Meanwhile, when there is no input from the AC adaptor power supply 222 or the USB power supply 223, the charge control circuit 101 receives electricity supplied from the first battery 102 via the first-battery electricity supply line 216 and supplies electricity of the drive power supply 220 to the logic power supply IC 221 and the booster circuit 103 via the diode 218.

The voltages of the AC adaptor power supply 222 and the USB power supply 223 are each +5 volts. The voltage supplied from the first battery 102 to the first-battery electricity supply line 216 is +3.6 to +4.2 volts. The voltage of the drive power supply 220 is +3.6 to +4.2 volts.

When the amount of charge of the second battery 112 is sufficient, the EP controller 201 uses the input power supply switching signal 207 to cause the charge control circuit 101 to perform the following controls. That is, the charge control circuit 101 receives electricity supplied from the second battery 112 via the charge-and-discharge control circuit 111 and the second-battery electricity supply line 217 and supplies electricity of the drive power supply 220 to the logic power supply IC 221 and the booster circuit 103 via the diode 219.

The diode 219 is connected so that, while the drive power supply 220 is being supplied from the first battery 102 side, the electricity is prevented from flowing backward to the second battery 112 side. The diode 218 is connected so that, while the drive power supply 220 is being supplied from the second battery 112 side, the electricity is prevented from flowing backward to the first battery 102 side.

In step S301, upon supply of the drive power supply 220 from the charge control circuit 101, the logic power supply IC 221 is turned on. The logic power supply IC 221 generates a logic power-supply voltage VCC of +1.8 to +3.3 volts from the drive power supply 220 and starts outputting to control circuit parts within the system (timing t1 in FIG. 4(*a*)). As a result, the control circuit parts become operable.

In step S302, the booster circuit 103 is turned on by a voltage boost control signal 208 from the EP controller 201. As a result, the booster circuit 103 starts to boost the drive power supply 220 of +3.6 to 4.2 volts supplied from the charge control circuit 101 to the boosted voltage VDDH which is, for example, about +40 volts and output this boosted voltage VDDH (timing t2 of (b) in FIG. 4).

Figure 3:
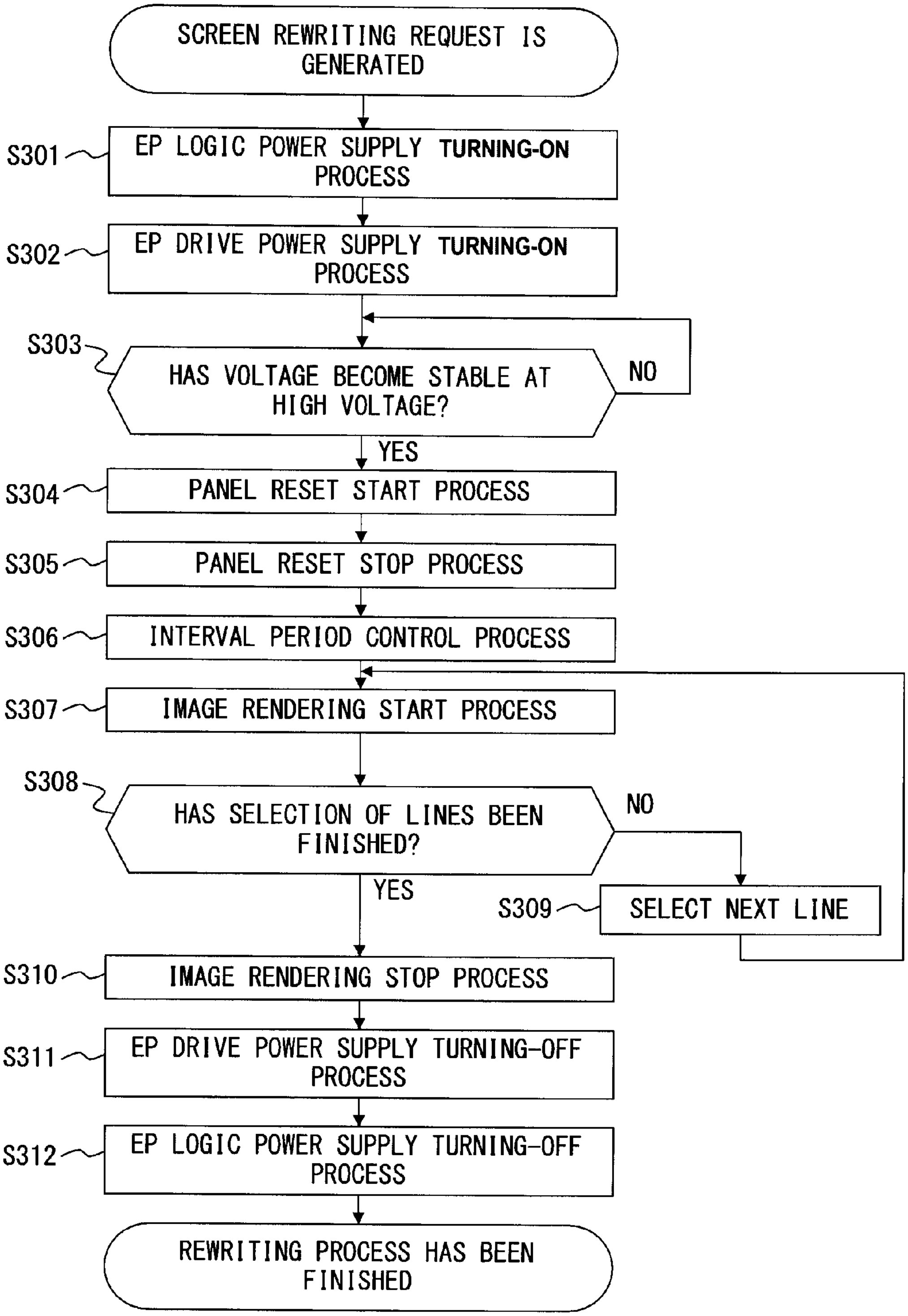
FIG. 3 is a flowchart illustrating processes performed in the second embodiment.
Figure 4:
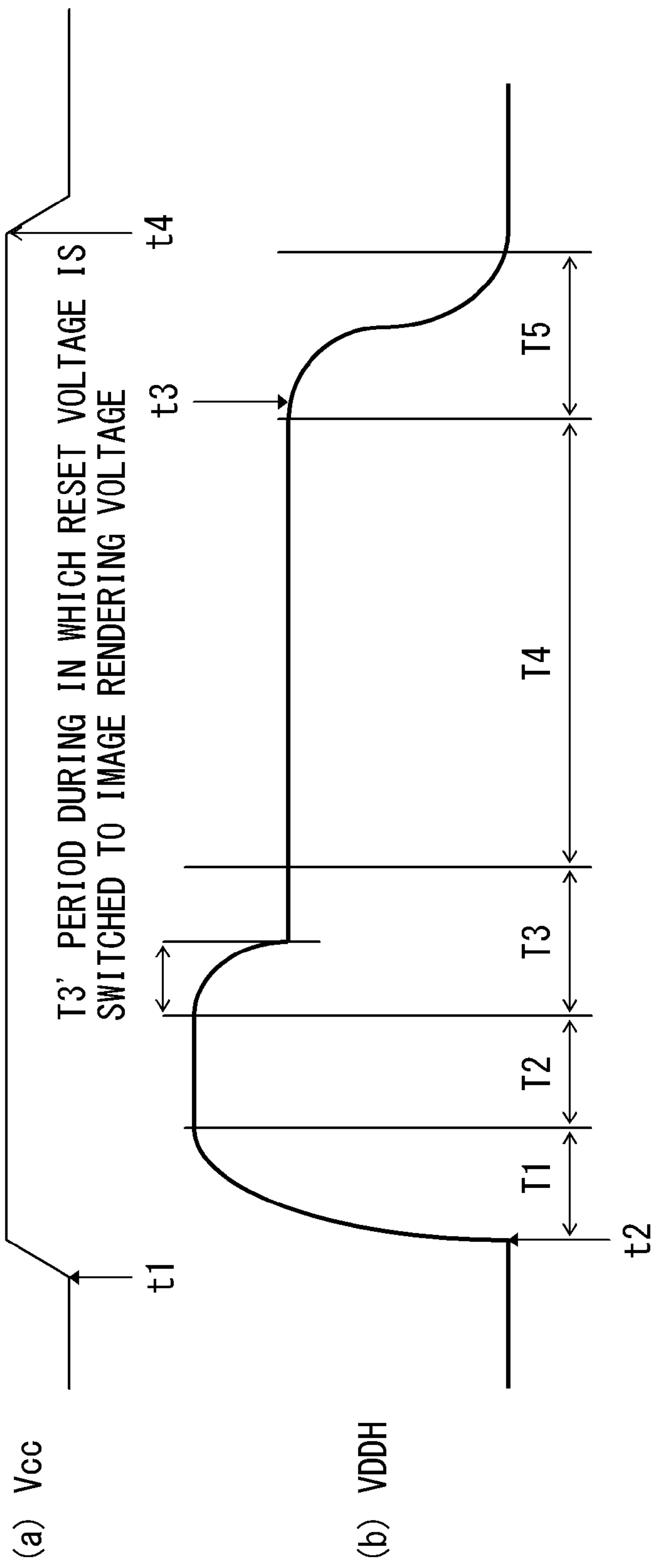
FIG. 4 is a timing chart illustrating processes performed in the second embodiment.

After this, the wait continues until the boosted voltage VDDH becomes stable at a preset high voltage (the determination process of step S303 in FIG. 3 is repeated) (period T1 of (b) in FIG. 4). This may be achieved by a configuration in which the EP controller 201 counts a preset period T1 or may be achieved by a configuration in which the EP controller 201 monitors the voltage value of the boosted voltage VDDH.

After the boosted voltage VDDH is stabilized, a panel reset start process is executed (step S304 in FIG. 3).

In step S304, a switch control signal 212 applied from the EP controller 201 to a gate terminal turns on the FET switch 105, and a switch control signal 213 applied from the EP controller 201 to the gate terminal turns off the FET switch 110. In addition, a voltage control signal 209 from the EP controller 201 causes the voltage division/voltage setting circuit 106 to start outputting various voltage signals, including the boosted voltage VDDH, needed for driving the COM-DV 107 and the SEG-DV 108 (i.e., signals represented as VDDH, V21C, V34C, and V5 in FIG. 2).

Next, in step S304, the DV control signals 210 and 211 from the EP controller 201 cause the COM-DV 107 to select a plurality of lines within the entire image rendering region on the EP panel 109, which is an object to be rewritten, and a select voltage is applied from the SEG-DV 108. This condition is continued for the period T2 of (b) in FIG. 4 (i.e., several milliseconds to several hundred milliseconds), with the result that the entire image rendering region on the EP panel 109 which is an object to be rewritten is in the transparent state.

After passage of the period T2 in FIG. 4, a panel reset stop process is performed in which the aforementioned voltage applying operation is finished (step S305 in FIG. 3).

Next, an interval period control process is executed (step S306 in FIG. 3) (period T3 of (b) of FIG. 4). In step S306, the voltage which has been applied to the EP panel 109 is removed and the EP panel 109 is thus put in a planar state. The voltage boost control signal 208 from the EP controller 201 changes the voltage value of the boosted voltage VDDH generated by the booster circuit 103, with the result that a reset voltage (about +38 to +40 volts) is switched to an image rendering voltage (about +24 volts) (period T3' of (b) in FIG. 4).

After the passage of the aforementioned interval period (period T3 of (b) in FIG. 4), an image rendering start process is executed (step S307 in FIG. 3). In step S307, the COM-DV 107 selects the initial horizontal line of the image rendering region on the EP panel 109 which is an object to be rewritten, and a select voltage or unselect voltage is applied to a vertical line of the EP panel 109 selected by the SEG-DV 108. As a result, the state of a corresponding pixel of the EP panel 109 is determined and an image is rendered on this pixel.

Next, it is determined whether the selection of all horizontal lines of the image rendering region on the EP panel 109 which is an object to be rewritten has been finished or not (step S308 in FIG. 3).

When the selection of all of the horizontal lines has not been finished, the COM-DV 107 selects the next horizontal line of the image rendering region on the EP panel 109 which is an object to be rewritten (the determination result of step S308 in FIG. 3 is the judgment of "NO"→step S309), and the image rendering process of step S307 is repeated (step S309 in FIG. 3→step S307).

When the selection of all of the horizontal lines is finished, an image rendering stop process is performed in which the image rendering process on the image rendering region which is an object to be rewritten is finished (step S308 in FIG. 3→step S310).

The aforementioned processes of steps S307 to S310 in FIG. 3 are controlled by the DV control signals 210 and 211 output from the EP controller 201 to the COM-DV 107 and the SEG-DV 108. The operations in this period are performed during the period T4 in FIG. 4.

After the image rendering process above is finished, an EP drive power supply turning-off process is performed (step S311 in FIG. 3) (timing t3 of (b) in FIG. 4).

In step S311, the voltage boost control signal 208 and the voltage control signal 209 from the EP controller 201 turn off the booster circuit 103 and the voltage division/voltage setting circuit 106.

Also in step S311, the switch control signal 212 applied from the EP controller 201 to the gate terminal turns off the FET switch 105, and the switch control signal 213 applied from the EP controller 201 to the gate terminal turns on the FET switch 110.

As a result, in step S311, electric charges accumulated in the power-supply smoothing capacitor 104 are input to the charge-and-discharge control circuit 111 via the FET switch 110. The charge-and-discharge control circuit 111 causes electric charges to be discharged from the power-supply smoothing capacitor 104 while charging the second battery 112. This operation is performed during period T5 in FIG. 4.

Finally, an EP logic power supply turning-off process is performed (step S312 in FIG. 3). In step S312, upon stopping of the output of the drive power supply 220 from the charge control circuit 101, the output of the logic power-supply voltage VCC to each control circuit part within the system by the logic power supply IC 221 is stopped (timing t4 of (a) in FIG. 4).

As a result of the operation above, the system will be in a stand-by state in which it consumes the minimum amount of electricity, and this state will last until the next screen rewrite request signal 206 is generated.

In the operations of the second embodiment described above, electricity is collected from the power-supply smoothing capacitor 104 and sent to the second battery 112 after an image rendering operation which follows a reset operation. Here, when only a reset operation is performed without an image rendering operation, electricity is collected from the power-supply smoothing capacitor 104 and sent to the second battery 112 after the reset operation.

A specific electricity collection effect in the first or second embodiment will be described in the following.

Firstly, collected electricity at the time of resetting the EP panel 109 may be calculated as indicated in the following example.

Capacity C of power-supply smoothing capacitor 104: 47 μF (microfarads)

Capacitor voltage Vc: e.g., 38 volts (=boosted voltage VDDH)

Capacitor electric charge Q

=Capacitor capacity C×Capacitor voltage Vc

=47 μF×38 volts=1786 μC

Voltage V of second battery 112=4.2 volts

Amount of charge W of second battery 112 obtained through one reset operation $=(1/2)\times Q\times V^2$

=0.5×1786×(4.2×4.2)

=15752.52 μWs=15.752 mWs (milliwatt sec)

Meanwhile, electricity needed at the time of resetting the EP panel 109 may be calculated as indicated in the following example.

500 mA×4.2 volts×0.2 sec=420 mWs

Accordingly, 420 mWs/15.752 mWs=26.66 times

That is, when twenty seven reset operations are finished, electric charges needed for one reset operation are accumulated. This means:

15.752/420×100=3.75%

In other words, 3.75% of image rendering operations may be performed without electricity being newly supplied.

In this way, in accordance with the first or second embodiment, electricity supplied to a liquid crystal display element, such as the EP panel 109, can be collected effectively. When the amount of charge of the second battery 112 is enough to supply electricity, the electricity supplied from the charge control circuit 101 to the booster circuit 103 is switched from the electricity from the AC adaptor power supply 113 or the first battery 102 to the electricity from the second battery 112. As a result, collected electricity can be reused. Such an advantage is particularly effective for apparatuses which are driven mainly by a battery, e.g., hand-held information terminals.

In regard to the power-supply smoothing capacitor 104, the configuration of charge-and-discharge circuitry 200 as described in FIG. 2 enables a setting voltage to be achieved in a shorter time than in the case of natural discharge. In addition, the time needed to boost a voltage may be shortened by also accessorily boosting the voltage. These features can improve the image rendering capability of a liquid crystal display system which has a memory property.

In the above first or second embodiment, electric charges accumulated in the power-supply smoothing capacitor 104 connected just after the booster circuit 103 are collected into the second battery 112. Meanwhile, a smoothing capacitor may also be connected for each of the voltage signals output from the voltage division/voltage setting circuit 106 (VDDH, V21C, V34C, V5, and the like in FIG. 2), so that electric charges accumulated in each smoothing capacitor can be collected into the second battery 112 upon finishing of a resetting operation (when there is no image rendering operation) or an image rendering operation. This configuration can achieve further power-saving.

What is claimed is:

1. A drive circuit for driving a liquid crystal display element with a memory property by generating a drive power supply from a first battery within an apparatus or an external power supply input from outside the apparatus, by boosting a voltage of the drive power supply to generate a boosted voltage, and by supplying the boosted voltage to a driver circuit of the liquid crystal display element via a power-supply smoothing capacitor, the drive circuit comprising:

a first switch circuit to supply the boosted voltage to the driver circuit, the first switch being turned on while the liquid crystal display element is being reset or while an image is being rendered and being turned off during a period in which electric charges accumulated in the power-supply smoothing capacitor is discharged when the drive power supply and external power supply to the apparatus are stopped after the image rendering process is finished;

a second battery installed within the apparatus;

a second switch circuit which is turned on during the period and which is turned off while the liquid crystal display element is being reset or while an image is being rendered; and a charge-and-discharge control circuit to cause electric charges accumulated in the power-supply smoothing capacitor to be discharged into the second battery during the period in which the second switch circuit is ON.

2. The drive circuit for driving the liquid crystal display element with a memory property according to claim 1, wherein when an amount of charge of the second battery is as large as or larger than a predetermined amount during the period in which the second switch is OFF, the charge-and-discharge control circuit supplies electricity stored in the second battery to the drive power supply.

3. The drive circuit for driving the liquid crystal display element with a memory property according to claim 1, wherein the liquid crystal display element is a liquid crystal display panel used for an electronic-paper display apparatus.

* * * * *